United States Patent [19]

Tokoro

[11] 4,144,711
[45] Mar. 20, 1979

[54] EXHAUST GAS PURIFYING DEVICE OF AN INTERNAL COMBUSTION ENGINE

[75] Inventor: Masayoshi Tokoro, Susono, Japan

[73] Assignee: Toyota Jidosha Kogyo Kabushiki Kaisha, Toyota, Japan

[21] Appl. No.: 779,053

[22] Filed: Mar. 18, 1977

[30] Foreign Application Priority Data

Dec. 7, 1976 [JP] Japan .................. 51-146086

[51] Int. Cl.² ............................................. F01N 3/15
[52] U.S. Cl. ......................................... 60/276; 60/289
[58] Field of Search .............. 60/299, 288, 276, 290, 60/289, 303, 297, 301, 324; 23/288 FC, 288 FB

[56] References Cited

U.S. PATENT DOCUMENTS

| 3,065,595 | 11/1962 | Gary | 60/303 |
|---|---|---|---|
| 3,132,473 | 5/1964 | Hass | 60/297 |
| 3,359,719 | 12/1967 | Cataldo | 60/324 |
| 3,421,315 | 1/1969 | Aoi | 60/297 |
| 3,429,656 | 2/1969 | Taylor | 60/301 |
| 3,503,714 | 3/1970 | Lang | 60/288 |
| 3,768,259 | 10/1973 | Carnahan | 60/276 |
| 3,780,772 | 12/1973 | Carnahan | 23/288 FC |
| 3,982,394 | 9/1976 | Hartel | 60/276 |
| 4,065,918 | 1/1978 | Rifkin | 23/288 FC |

FOREIGN PATENT DOCUMENTS 131434  8/1919  United Kingdom ................ 60/324

Primary Examiner—Douglas Hart
Attorney, Agent, or Firm—Stevens, Davis, Miller & Mosher

[57] ABSTRACT

Disclosed is an internal combustion engine comprising a catalytic converter containing a three way catalyzer therein. A secondary air feed control device, an air-fuel ratio detector and the catalytic converter are arranged in this order in the exhaust passage of the engine. An exhaust gas mixing device is disposed in the exhaust passage between the air-fuel ratio detector and the catalytic converter so as to make a total air-fuel ratio in the inlet of the catalytic converter equal to the stoichiometric air-fuel ratio at all times.

4 Claims, 6 Drawing Figures

EXHAUST GAS PURIFYING DEVICE OF AN INTERNAL COMBUSTION ENGINE

DESCRIPTION OF THE INVENTION

The present invention relates to an exhaust gas purifying device of an internal combustion engine.

As a catalyzer capable of simultaneously reducing the amount of harmful HC, CO and $NO_x$ components in the exhaust gas, there has been known a three way catalyzer. In order to effectively reduce the amount of harmful components in the exhaust gas by using this three way catalyzer, it is necessary to make the total air-fuel ratio (assuming that the intake passage and the exhaust passage located upstream of the three way catalyzer are defined as an air-fuel passage, said total air-fuel ratio is defined as the ratio of the amount of fuel fed into said air-fuel passage to the amount of air fed into said air-fuel passage) equal to the stoichiometric air-fuel ratio.

As one of the methods for making the total air-fuel ratio equal to the stoichiometric air-fuel ratio, there has been known a method in which a carburetor forming a rich air-fuel mixture is disposed in the intake passage, and a catalytic converter containing a three way catalyzer therein is disposed in the exhaust passage of the engine. In addition, disposed in the exhaust passage located upstream of the catalytic converter is an air-fuel ratio detector capable of detecting whether the total air-fuel ratio is larger or smaller than the stoichiometric air-fuel ratio, and a secondary air feeding device is disposed in the exhaust passage located upstream of the air-fuel ratio detector. The secondary air feeding service is controlled by the output signal of the air-fuel ratio detector so as to feed into the exhaust passage secondary air necessary to make the total air-fuel ratio equal to the stoichiometric air-fuel ratio. However, in this method, the total air-fuel ratio is controlled in such a manner that, when the total air-fuel ratio decreases below the stoichiometric air-fuel ratio, secondary air is fed into the exhaust system and, as a result, when the total air-fuel ratio increases beyond the stoichiometric air-fuel ratio, the feeding operation of secondary air is stopped. Then, when the total air-fuel ratio again decreases below the stoichiometric air-fuel ratio, secondary air is fed into the exhaust system. Thus, in this method, while the mean value of the total air-fuel ratio during a given time is equal to the stoichiometric air-fuel ratio, the total air-fuel ratio in the inlet of the catalytic converter is alternately larger and smaller than the stoichiometric air-fuel ratio. As a result of this, it is difficult to efficiently purify the harmful components in the three way catalyzer.

An object of the present invention is to provide an exhaust gas purifying device in which exhaust gas containing a large amount of secondary air therein is mixed with exhaust gas containing no secondary air therein or with exhaust gas containing a small amount of secondary air therein in the exhaust passage located upstream of the catalytic converter so that the total air-fuel ratio in the inlet of the catalytic converter can be made equal to the stoichiometric air-fuel ratio.

According to the present invention, there is provided an exhaust gas purifying device of an internal combustion enging having a cylinder, an intake passage and an exhaust passage, comprising air-fuel mixture forming means for feeding a rich air-fuel mixture into the cylinder of the engine, a catalytic converter disposed in said exhaust passage and containing a three way catalyzer therein, an air-fuel ratio detector disposed in said exhaust passage located upstream of said catalytic converter for providing a control signal indicating whether the total air-fuel ratio at the detecting position of said air-fuel ratio detector is larger or smaller than the stoichiometric air-fuel ratio, and secondary air feed control means disposed in an air-fuel passage consisting of said intake passage and of said exhaust passage located upstream of said air-fuel ratio detector for controlling an amount of secondary air fed into said exhaust passage in response to the control signal of said air-fuel ratio detector, so as to make the total air-fuel ratio detected by said air-fuel ratio detector equal to the stoichiometric air-fuel ratio, wherein the improvement comprises a mixing device disposed in said exhaust passage between said air-fuel ratio detector and said catalytic converter to promote the mixing operation of the exhaust gas for always making the total air-fuel ratio in the inlet of said catalytic converter equal to the stoichiometric air-fuel ratio.

The present invention may be more fully understood from the following description of preferred embodiments of the invention, together with the accompanying drawings.

DESCRIPTION OF PREFERRED EMBODIMENT

Figure 1:
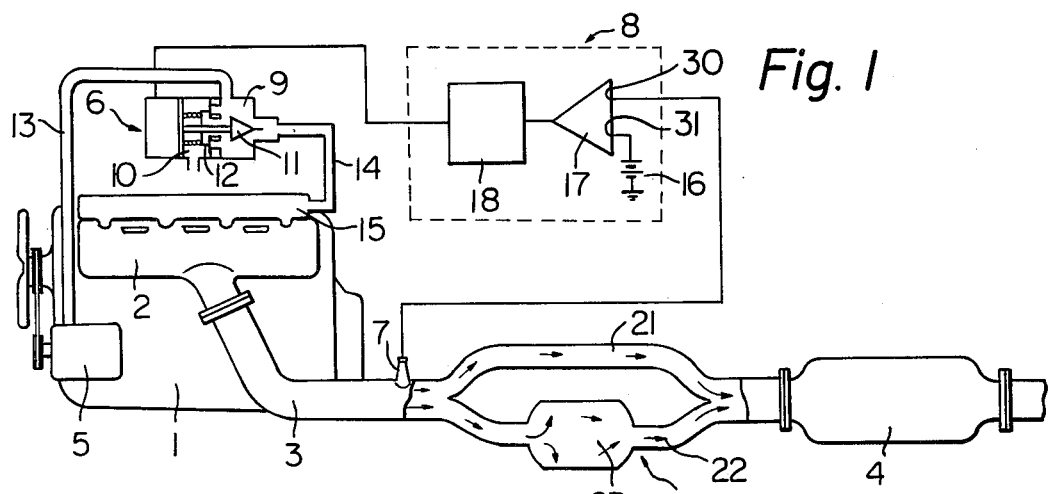
FIG. 1 is a schematic general view of an internal combustion engine equipped with a mixing device according to the present invention.

Referring to FIG. 1, 1 designates an engine body, 2 an exhaust manifold, 3 an exhaust pipe, 4 a catalytic converter containing a three way catalyzer therein, 5 an air pump driven by the engine, 6 an electromagnetic valve and 7 an air-fuel ratio detector. The air-fuel ratio detector is connected to the electromagnetic valve 6 via an electromagnetic valve control circuit 8. In addition, a carburetor forming a rich air-fuel mixture (not shown) is disposed in the intake system of the engine. The electromagnetic valve 6 has in its housing a secondary air chamber 9 and an atmospheric pressure chamber 10. An opening control valve 11 is disposed in the secondary air chamber 9, and a pressure regulating valve 12 is disposed in the atmospheric pressure chamber 10. The secondary air chamber 9 is connected to the air pump 5 via a secondary air feed conduit 13 on the one hand, and to the exhaust manifold 2 via a secondary air feed conduit 14 and an air manifold 15 on the other hand.

The electromagnetic valve control circuit 8 comprises a comparator 17 having two inputs 30 and 31, and an amplifier 18 connected to the output side of the comparator 17. One of the inputs 30 of the comparator 17 is connected to the air-fuel ratio detector 7, and the other input 31 of the comparator 17 is connected to a reference voltage source 16. The output side of the amplifier 18 is connected to a solenoid of the electromagnetic valve 6. When the total air-fuel ratio at the detecting position of the air-fuel ratio detector 7 is smaller than the stoichiometric air-fuel ratio, the output voltage of the air-fuel ratio detector 7 is about 0.9 volt. Contrary to this, when the total air-fuel ratio at the detecting position of the air-fuel ratio detector 7 is larger than the stoichiometric air-fuel ratio, the output voltage of the air-fuel ratio detector 7 is about 0.1 volt. The voltage of the reference voltage source 16 is set to about 0.5 volt. Thus, when the total air-fuel ratio detected by the air-fuel ratio detector 7 is smaller than the stoichiometric air-fuel ratio, the comparator 17 is turned to the ON condition. As a result of this, since the solenoid of the electromagnetic valve 6 is energized, the opening control valve 11 is opened, whereby secondary air is fed into the exhaust manifold 2 from the air pump 5. Then, when the total air-fuel ratio detected by the air-fuel ratio detector 7 is larger than the stoichiometric air-fuel ratio due to the feeding of secondary air into the exhaust system, as mentioned above, the comparator 17 is turned to the OFF condition. As a result of this, the opening control valve 11 of the electromagnetic valve 6 is closed, whereby the feeding operation of secondary air is stopped. Thus, in the system shown in FIG. 1, since the feeding operation and the stoppage of the feeding operation of secondary air are alternately repeated, a large fluctuation of the total air-fuel ratio is caused as shown in FIG. 2(a).

Figure 2:
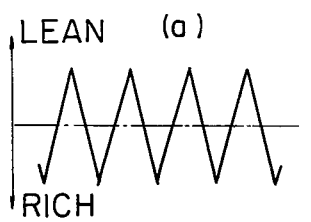
FIGS. 2(e) and 2(b) are graphs showing the fluctuation of the total air-fuel ratio.

According to the present invention, in order to prevent the fluctuation of the total air-fuel ratio, a mixing device generally indicated by a reference numeral 20 is disposed in the exhaust pipe 3 between the air-fuel ratio detector 7 and the catalytic converter 4. The mixing device comprises two branch pipes 21 and 22. A chamber 23 having a relatively large volume is formed in the branch pipe 22. The volume of the chamber 23 is set so that the difference between the length of time during which the exhaust gas passes through the branch pipe 21 and the length of time during which the exhaust gas passes through the branch 22 is equal to half of one time period of the fluctuation of the total air-fuel ratio shown in FIG. 2(a). In addition, the branch pipes 21 and 22 are so constructed that the volume of the exhaust gas passing through the branch pipe 21 is equal to that of the exhaust gas passing through the branch pipe 22. By setting the volume of the chamber 23 as mentioned above, exhaust gas containing a large amount of secondary air therein is mixed with exhaust gas containing no secondary air therein or with exhaust gas containing a small amount of secondary air therein at the meeting point of the exhaust gas discharged from the branch pipes 21 and 22. As a result of this, as is shown in FIG. 2 (b), the total air-fuel ratio in the inlet of the catalytic converter 4 is always equal to an approximately stoichiometric air-fuel ratio.

Figure 3:
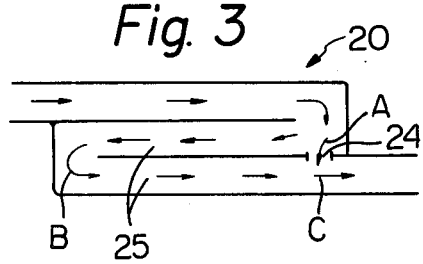
FIG. 3 is a schematic view of another embodiment of the mixing device of FIG. 1.

FIG. 3 shows another embodiment of the mixing device. In this embodiment, the length of the passage of the exhaust gas is set so that the difference between the length of time until the exhaust gas stream A flowing into the opening 24 reaches the point C and the length of time until the exhaust gas stream B reaches the point C is equal to half of one time period of the fluctuation. In addition, the opening 24 is so formed that the volume of the exhaust gas stream A is equal to that of the exhaust gas stream B.

Figure 4:
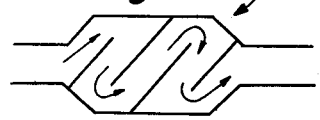
FIG. 4 is a schematic view of a further embodiment of the mixing device of FIG. 1.
Figure 5:
FIG. 5 is a schematic view of a still further embodiment of the mixing device of FIG. 1.
Figure 6:
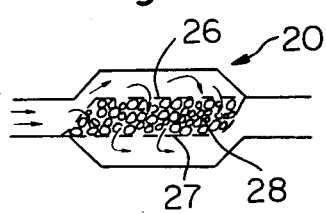
FIG. 6 is a schematic view of a still further embodiment of the mixing device of FIG. 1.

FIGS. 4 through 6 show the other separate embodiments of the mixing device. In the embodiments shown in FIGS. 4 and 5, the inside of the mixing vessel 20 is formed in a labyrinth construction so that exhaust gas containing a large amount of secondary air therein is mixed with exhaust gas containing no secondary air therein in the inside of the mixing vessel 20. The mixing vessel 20 shown in FIG. 6 has therein a granule layer 28 filled with a large number of granules, such as alumina granules, between a pair of perforated plates 26 and 27. Thus, exhaust gas containing a large amount of secondary air therein is mixed with exhaust gas containing no secondary air therein while the exhaust gas passes through the granule layer 28.

According to the present invention, since the total air-fuel ratio in the inlet of the catalytic converter 4 is always equal to an approximately stoichiometric air-fuel ratio, an extremely high purifying ability can be always obtained, thus effectively reducing the amount of harmful HC, CO and $NO_x$ components in the exhaust gas.

In any other secondary air feed control device in which an amount of secondary air fed into the exhaust system is controlled by the output of the air-fuel ratio detector mounted on the exhaust system, the fluctuation of the total air-fuel ratio as shown in FIG. 2(a) is always caused. Consequently, the present invention can be applied to an internal combustion engine provided with a secondary air feed control device of any other type.

While the invention has been described with reference to specific embodiments chosen for purposes of illustration it should be apparent that numerous modifications could be made thereto by those skilled in the art without departing from the spirit and scope of the invention.

What is claimed is:

1. In an exhaust gas purifying device for an internal combustion engine having a cylinder, an intake passage and an exhaust passage, air-fuel mixture forming means for feeding an air-fuel mixture into the cylinder of the engine, a catalytic converter in said exhaust passage having a three way catalyzer therein, said converter having an inlet, an air-fuel ratio detector in said exhaust passage upstream of said catalytic converter for producing a control signal indicating whether the total air-fuel ratio at the detecting position of the air-fuel ratio detector is larger or smaller than the stoichiometric air-fuel ratio, means for controlling the amount of secondary air fed into said exhaust passage in response to the signal produced by the air-fuel ratio detector to make the total air-fuel ratio detected by the air-fuel ratio detector change toward being equal to the stoichiometric air-fuel ratio, the improvement comprising means for producing a total air-fuel ratio at the inlet of the catalytic converter substantially equal to the stoichiometric air-fuel ratio, said producing means comprising a mixing device in said exhaust passage between said air-fuel ratio detector and said catalytic converter for mixing the exhaust gas, said mixing device having two paths for exhaust gas therethrough and being so constructed that the difference between the length of time during which the exhaust gas passes through one of said exhaust paths and the length of time during which the exhaust gas passes through the other of said exhaust paths is substantially equal to half of one time period of the fluctuation of the total air-fuel ratio in said exhaust passage.

2. In an exhaust gas purifying device for an internal combustion engine having a cylinder, an intake passage and an exhaust passage, air-fuel mixture forming means for feeding an air-fuel mixture into the cylinder of the engine, a catalytic converter in said exhaust passage having a three way catalyzer therein, said converter having an inlet, an air-fuel ratio detector in said exhaust passage upstream of said catalytic converter for producing a control signal indicating whether the total air-fuel ratio at the detecting position of the air-fuel ratio detector is larger or smaller than the stoichiometric air-fuel ratio, means for controlling the amount of secondary air fed into said exhaust passage in response to the signal produced by the air-fuel ratio detector to make the total air-fuel ratio detected by the air-fuel ratio detector change toward being equal to the stoichiometric air-fuel ratio, the improvement comprising means for producing a total air-fuel ratio at the inlet of the catalytic converter substantially equal to the stoichiometric air-fuel ratio, said producing means comprising a mixing device in said exhaust passage between said air-fuel ratio detector and said catalytic converter for mixing the exhaust gas, said mixing device comprising a pair of separate branch passageways for exhaust gas therethrough and an enlarged chamber of fixed volume in one of said passageways, said mixing device being so constructed that the difference between the length of time during which the exhaust gas passes through one of said exhaust passageways and the length of time during which the exhaust gas passes through the other of said exhaust passageways is substantially equal to half of one time period of the fluctuation of the total air-fuel ratio in said exhaust passage and that the volume of exhaust gas passing through one of said passageways over any given period of time is substantially equal to the volume of exhaust gas passing through the other of said passageways during that period of time, said passageways being fluidly interconnected at their downstream ends upstream of the inlet of the catalytic converter.

3. In an exhaust gas purifying device for an internal combustion engine having a cylinder, an intake passage and an exhaust passage, air-fuel mixture forming means for feeding an air-fuel mixture into the cylinder of the engine, a catalytic converter in said exhaust passage having a three way catalyzer therein, said converter having an inlet, an air-fuel ratio detector in said exhaust passage upstream of said catalytic converter for producing a control signal indicating whether the total air-fuel ratio at the detecting position of the air-fuel ratio detector is larger or smaller than the stoichiometric air-fuel ratio, means for controlling the amount of secondary air fed into said exhaust passage in response to the signal produced by the air-fuel ratio detector to make the total air-fuel ratio detected by the air-fuel ratio detector change toward being equal to the stoichiometric air-fuel ratio, the improvement comprising means for producing a total air-fuel ratio at the inlet of the catalytic converter substantially equal to the stoichiometric air fuel ratio, said producing means comprising a mixing device in said exhaust passage between said air-fuel ratio detector and said catalytic converter for mixing the exhaust gas, said mixing device comprising a pair of separate branch passageways for exhaust gas therethrough and being so constructed that the difference between the length of time during which the exhaust gas passes through one of said exhaust passageways and the length of time during which the exhaust gas passes through the other of said exhaust passageways is substantially equal to half of one time period of the fluctuation of the total air-fuel ratio in said exhaust passage and that the volume of exhaust gas passing through one of said passageways over any given period of time is substantially equal to the volume of exhaust gas passing through the other of said passageways during that period of time, said passageways being fluidly interconnected at their downstream ends upstream of the inlet of the catalytic converter.

4. In an exhaust gas purifying device as claimed in claim 1, wherein the length of one of said exhaust paths is different from that of the other exhaust path.

* * * * *